July 30, 1929.  H. L. HOOD  1,722,574
COASTER
Filed July 16, 1928
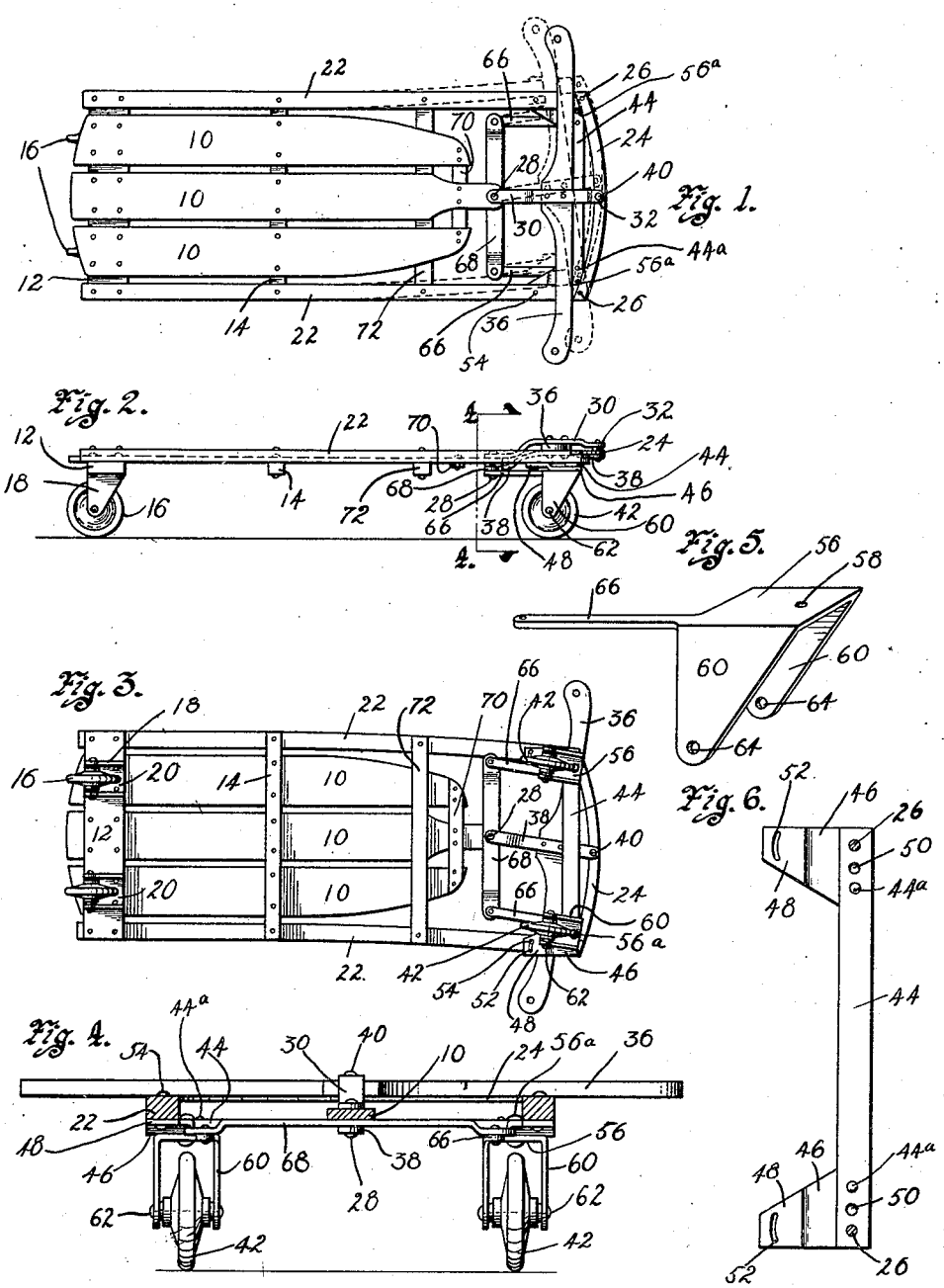
Witness
Vincent Brew
Inventor
Hubert L. Hood
by Bair, Freeman & Sinclair
Attorneys Patented July 30, 1929.

1,722,574

UNITED STATES PATENT OFFICE.

HUBERT L. HOOD, OF DES MOINES, IOWA.

COASTER.

Application filed July 16, 1928. Serial No. 293,232.

The object of my invention is to provide a coaster of very simple, durable and inexpensive construction.

More particularly, it is my object to provide a coaster for children, comprising a body somewhat similar to that of a sled mounted on wheels, and having such structure as to provide for the convenient and easy steering of the coaster.

With these and other objects in view, my invention consists in the construction, arrangement and combination of the various parts of my coaster, whereby the objects contemplated are attained, as hereinafter more fully set forth, pointed out in my claims, and illustrated in the accompanying drawings, in which:

Figure 1 is a top or plan view of my coaster.

Figure 2 is a side elevation of the same.

Figure 3 is an inverted plan view of the coaster showing the parts adjusted for steering.

Figure 4 is a detail, sectional view taken on the line 4—4 of Figure 2.

Figure 5 is a perspective view of one of the front wheel brackets; and

Figure 6 is a plan view of a connecting bearing.

In the accompanying drawings, I have shown a coaster having a bed, comprising longitudinally arranged members 10 connected by spaced cross members 12 and 14 secured to their under sides.

The rear part of the coaster is supported by small wheels 16 mounted between the downwardly projecting ears 18 of brackets 20. These brackets are fastened to the under surface of the cross bar 12.

At the sides of the bed and extending the full length thereof and projecting forwardly beyond the members 10 are laterally flexible side members 22. These side members are rigidly connected to the cross members 12 and 14 as indicated in Figure 3.

At their forward end, they are pivotally connected with the ends of a curved cross bar 24 by the pivot bolts or the like 26.

Pivoted to the front end of the central member 10 as by a bolt 28 is a forwardly extending strap iron 30, which is pivoted at its forward end as at 32 to the cross bar 24.

A transverse steering bar 36 is fixed to the strap iron 30 as shown in Figures 1 and 2.

For better reinforcement, a lower strap iron 38 is pivoted on the bolt 28 and extends forwardly and is fixed to the under side of the steering bar 36 and pivoted to the cross bar 24 by means of the bolt 40. The bolt 40 is the same one that pivots the strap iron 30 to the cross bar 24.

The ends of the steering bar 36 project laterally beyond the body of the coaster as clearly shown in Figures 1 and 3.

It will thus be seen that by pushing on either end of the cross bar 36, the strap irons 30 and 38 rigidly secured to that steering bar 36 will be swung on the pivot bolt 28 for swinging the cross bar 24 and the forward ends of the flexible side members 22 laterally.

The front end of the coaster is supported on steerable wheels 42. For mounting the steerable wheels 42 on the coaster, I provide the following means:

There is provided a cross bar 44 shown in plan in Figure 6. At each end of the cross bar 44, there is secured thereto a bracket 46 extending rearwardly and having a raised rear portion 48.

At each end of the bar 44 are three holes 50. The bolts 26 are extended through the outer holes 50 whereby the bar 44 is pivoted to the forward ends of the flexible members 22 and the brackets 46 are secured to the bar 44 and the flexible members 22. The brackets 46 are also fixed to the bar 44 by means of rivets 44ª extended through the inner holes 50.

The raised portions 48 of the brackets 46 are provided with slots 52 curved on the arcs of circles having their centers in the bolts 26. The raised portions 48 are secured to the side members 22 rearwardly from the bolts 26 by means of bolts 54 (see Figure 3) extending from said members 22 through the slots 52.

Mounted on the under side of the bar 44 are wheel brackets 56, which have holes 58 to receive the bolts 56ª, by which they are secured to the brackets 46 and the bar 44 and are also provided with downwardly extending ears 60.

The axles 62 of the wheels 42 are journaled in holes 64 in the ears 60 substantially rearwardly from the pivot bolts 26.

Each bracket 56 has a rearwardly extending arm 66 to the rear end of which is pivoted one end of a cross bar 68. The cross bar 68 is pivoted on the bolt 28 already mentioned. (See Figures 1 and 3).

In the use of my improved coaster, the user can employ the guiding bar 36 to twist the members 22 laterally as shown for instance in Figure 3.

When one end of the bar 36 is pushed forwardly or the other end pulled rearwardly, the members 30 and 38 to which the bar 36 is rigidly secured will be swung on the pivot bolt 28 to move their forward ends laterally and thus flex the forward ends of the members 22.

This movement will, of course, impart movement to the brackets 56 and the wheels carried thereby for moving the wheels 42 for guiding. The frame formed by the members 44, 66 and 68 is thus shifted from a rectangle to the shape shown in Figure 3.

The forward ends of the brackets 46 are fixed with relation to the members 22 but the rearward ends slide slightly on the bolts 54.

This structure provides a convenient guiding mechanism, which is very strong, durable and easily manipulated.

The members 10 of the bed are rigidly connected at their forward ends by a cross member 70. The laterally flexible members 20 are connected together by a cross brace 72 pivoted at each end to one of the members 22 and forwardly with relation to the member 14 (see Figure 3).

By using the cross bar 44 and the brackets 46, as shown, a strong construction is afforded and proper supporting surface is allowed for the brackets 56.

One important feature of my coaster steering mechanism may now be more fully referred to. It will be noted that when the steering bar 36 is actuated for flexing the members 22, those members flex from the fixed bar 14. The brackets 56 are pivoted at their forward ends and the forward ends therefore, swing laterally with the forward ends of the members 22.

The brackets 56 being connected at their rearward ends to the bar 68 will be turned to a sharper angle with relation to the longitudinal axis of the coaster than the forward ends of the members 22. The projection of the bolts 54 traveling in the curved slots 52, affords reinforcement and support for the cross bar 44 and yet allows it to swing in accordance with the movement of the members 22. Thus in steering, the wheels are turned a little more than are the members 22 for affording a desirable range of steerability.

I claim as my invention:

1. A coaster having a bed, spaced wheels under the rear end of the bed, laterally extended flexible side members rigidly secured to the bed at their rear portions, a cross bar connecting the front ends of said flexible members, a connecting member between said cross bar and said bed, means for pivoting the connecting member to the cross bar, a second means for pivoting the cross member to the bed, a steering bar fixed to said connecting member, wheels for supporting the forward ends of the flexible side members, and means for connecting said last wheels with the coaster whereby when the front ends of the flexible members are swung laterally for steering, such last wheels will be steerably turned to greater degrees than such front ends.

2. In a device of the class described, a bed, supporting wheels for the rear end of said bed, laterally flexible members supported on said bed at the sides thereof and projecting forwardly therefrom, a front cross bar pivoted to the forward ends of said flexible members, a connecting member between the bed and the front cross bar, means for pivoting said connecting member to the front cross bar, means for pivoting said connecting member to the bed, a cross bar pivoted on said last-named means, brackets pivotally connected at the front ends of said flexible members, arms rigidly connected with said brackets and pivoted to the ends of said second-described cross bar, and a steering bar fixed to said connecting member.

3. In a device of the class described, a bed, supporting wheels for the rear end of the bed, laterally flexible members rigidly connected with said bed substantially rearwardly from the forward end thereof and at the sides thereof and projecting forwardly from the bed, means for connecting the forward ends of the flexible members, a member pivoted to said bed and projecting forwardly therefrom and pivoted to said means, a steering bar rigidly fixed to said last described member, wheel supporting brackets pivoted at the forward ends of said flexible members, wheels mounted in said last described brackets, arms projecting rearwardly from said brackets, a cross member pivoted to said arms and to the front end of the bed whereby when said flexible members are flexed the last described wheels will be turned to sharper angles with relation to the longitudinal axis of the device than will the front ends of the flexible members.

Des Moines, Iowa, July 11, 1928.

HUBERT L. HOOD.